UNITED STATES PATENT OFFICE.

OTTO DEGNER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

COMPOUND OF SILVER AND NUCLEINIC ACIDS.

No. 852,544.  Specification of Letters Patent.  Patented May 7, 1907.

Application filed April 17, 1906. Serial No. 312,175. (Specimens.)

*To all whom it may concern:*

Be it known that I, OTTO DEGNER, doctor of philosophy, chemist, a citizen of the German Empire, residing at Elberfeld, Germany, Kingdom of Prussia, have invented new and useful Improvements in Compounds of Silver and Nucleinic Acids, of which the following is a specification.

My invention relates to the production of new soluble compounds of nucleinic acids and silver. The process for the preparation of these bodies consists in treating the insoluble silver compounds of nucleinic acids or salts thereof with neutral-salt solutions.

Under the expression "nucleinic acids" I understand nucleinic acids of animal or vegetable origin, as they are obtained e. g. from yeast, sperm, thymus, etc. and which are distinguished from albumen, etc. as follows: (Cohnheim—*Chemie der Eiweisskörper*, II. Auflage, 1904, page 221):

```
         Nucleo proteid
            /      \
     Albumen      nuclein
     (Histon)   /      \
            Albumen   nucleinic acid.
```

The new silver compounds contain more than 10 per cent of silver which silver content is characteristic of the silver salts of nucleinic acid of the old art as described for example in German Patent No. 118,050. My new salts contain from 15 to 25 per cent. of silver. They are, when dry and pulverized, yellowish powders soluble in water with a yellowish-brown color and insoluble in ether and benzene. They contain the silver so firmly combined with the nucleinic acid molecule that on adding a diluted solution of caustic soda lye or a solution of common salt to the aqueous solution of the new silver compounds no precipitate is obtained. The new products possess valuable therapeutic properties as antiseptics and their freedom from irritation renders their application highly satisfactory. A solution of from 2 to 3 per cent may be used for external application.

In carrying out my new process practically I can proceed as follows, the parts being by weight:

Example 1. 40 parts of silver nitrate dissolved in water are stirred into a solution of 100 parts of the sodium salt of nucleinic acid from yeast in 300 parts of water. A voluminous precipitate is obtained to which a saturated solution of common salt is slowly added until a clear solution results. The soluble silver compound thus obtained is separated from its solution by the addition of alcohol, filtered off, washed several times with alcohol and dried *in vacuo*. It is a yellowish-white powder having the above mentioned properties and containing from 22 to 23 per cent of silver.

Example 2. 100 parts of the sodium salt of nucleinic acid from yeast are dissolved in 300 parts of water, and to this solution a watery solution of 30 parts of nitrate of silver is added with stirring. A voluminous precipitate is obtained to which a saturated solution of common salt is slowly added until a clear solution results. The soluble silver compound thus obtained is separated from its solution by the addition of alcohol, filtered off, washed several times with alcohol, and dried *in vacuo*. It is a yellowish-white powder, having the above-mentioned properties, and containing 15% of silver.

Example 3. 100 parts of the sodium salt of nucleinic acid from yeast are dissolved in 300 parts of water, and to this solution a watery solution of 45 parts of nitrate of silver is added with stirring. A voluminous precipitate is obtained to which a saturated solution of common salt is slowly added until a clear solution results. The soluble silver compound thus obtained is separated from its solution by the addition of alcohol, filtered off, washed several times with alcohol, and dried *in vacuo*. It is a yellowish-white powder, having the above-mentioned properties, and containing 25% of silver.

The process is carried out in an analogous manner on starting from nucleinic acids of any other origin or on using other neutral-salt solutions, such as solutions of sodium acetate, sodium nitrate, potassium chlorid etc.

Having now described my invention and in what manner the same is to be performed, what I claim as new and desire to secure by Letters Patent is:—

1. The herein-described new silver compounds of nucleinic acids containing from 15 to 25 per cent. of silver obtainable by the action of neutral-salt solutions on the insoluble silver compounds of nucleinic acids, which new silver compounds are, when dry and pulverized, yellowish powders soluble in water with a yellowish-brown color, insoluble in ether and benzene, and containing the silver so firmly combined with the nucleinic acid molecule that the aqueous solutions do not give any precipitate on the addition of dilute caustic soda lye or a solution of common salt; and being valuable antiseptics, substantially as described.

2. The herein described new specific silver compound of nucleinic acid containing about 22 per cent. of silver obtained from yeast, which new silver compound is obtainable by action of a common salt solution on the insoluble silver compound of nucleinic acid from yeast, and is, when dry and pulverized, a yellowish powder, soluble in water with a yellowish-brown color, insoluble in ether and benzene, and containing the silver so firmly combined with the nucleinic acid molecule that the aqueous solution does not give any precipitate on the addition of dilute caustic soda lye or a solution of common salt; and being a valuable antiseptic, substantially as described.

In testimony whereof I have hereunto set my hand in the presence of two subscribing witnesses.

OTTO DEGNER.

Witnesses:
OTTO KÖNIG,
ARTHUR MATTHÄWS.